United States Patent
Ibrahim et al.

(10) Patent No.: US 10,802,300 B2
(45) Date of Patent: Oct. 13, 2020

(54) INTERACTIVE DIMMABLE WINDOW SYSTEMS AND METHODS

(71) Applicant: THE BOEING COMPANY, Chicago, IL (US)

(72) Inventors: Yakentim Ibrahim, Brier, WA (US); Bernadette Berger, Seattle, WA (US); John Dan Mabry, Jr., Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 108 days.

(21) Appl. No.: 15/967,614

(22) Filed: May 1, 2018

(65) Prior Publication Data

US 2019/0113776 A1    Apr. 18, 2019

Related U.S. Application Data

(60) Provisional application No. 62/572,847, filed on Oct. 16, 2017.

(51) Int. Cl.
*G02F 1/01* (2006.01)
*B64C 1/14* (2006.01)
(Continued)

(52) U.S. Cl.
CPC .............. *G02F 1/0121* (2013.01); *B60J 3/04* (2013.01); *B64C 1/1484* (2013.01); *B64D 11/0015* (2013.01); *E06B 9/24* (2013.01); *G06F 3/0482* (2013.01); *G06F 3/04886* (2013.01); *E06B 2009/2464* (2013.01); *G06F 3/04847* (2013.01)

(58) Field of Classification Search
CPC ............... G02B 27/01; G02B 27/0101; G02B 2027/0118; G02B 2027/0196; G02B 6/0011; G02F 1/01; G02F 1/0121; G02F 1/13306; G02F 1/13338; G06F 3/0482; G06F 3/04847; G06F 3/0488; G06F 3/04886; G06F 3/01; G06F 3/017; G09G 3/34; G09G 3/36; G09G 3/3413; G09G 2320/0626; G09G 2360/144; B64C 1/14; B64C 1/1484; B60J 3/04; B64D 11/0015; E06B 9/24; E06B 2009/2464
USPC ................ 359/245, 230, 242, 265–272, 614; 345/205, 690; 349/16
See application file for complete search history.

(56) References Cited

U.S. PATENT DOCUMENTS

2009/0109036 A1    4/2009 Schalla
2013/0161971 A1    6/2013 Bugno
(Continued)

FOREIGN PATENT DOCUMENTS

| EP | 2851281 | 3/2015 |
| EP | 2857239 | 4/2015 |
| EP | 3006239 | 4/2016 |

OTHER PUBLICATIONS

Extended European Search Report for EP 18197415.5-1010, dated Feb. 12, 2019.

*Primary Examiner* — Jie Lei
(74) *Attorney, Agent, or Firm* — The Small Patent Law Group LLC; Joseph M. Butscher

(57) ABSTRACT

An interactive dimmable window system and method includes a dimmable window panel, and a passenger interface coupled to the dimmable window panel. The passenger interface includes a touchscreen that is configured to allow for touch-control of an electronic shade of the dimmable window panel.

21 Claims, 6 Drawing Sheets

(51) Int. Cl.
*G06F 3/0482* (2013.01)
*G06F 3/0488* (2013.01)
*B60J 3/04* (2006.01)
*B64D 11/00* (2006.01)
*E06B 9/24* (2006.01)
*G06F 3/0484* (2013.01)

(56) References Cited

U.S. PATENT DOCUMENTS

| | | | |
|---|---|---|---|
| 2015/0077337 A1* | 3/2015 | Coto-Lopez | B64D 11/0015 345/156 |
| 2015/0097389 A1* | 4/2015 | Dryselius | B60J 3/04 296/96.19 |
| 2016/0062327 A1 | 3/2016 | Fagan | |
| 2016/0104437 A1* | 4/2016 | Iwakawa | G02B 6/0011 345/690 |
| 2016/0318379 A1* | 11/2016 | Okuda | B60J 3/04 |

* cited by examiner

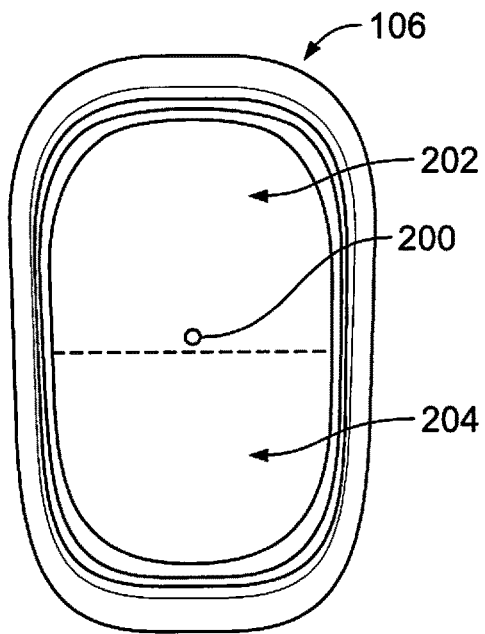
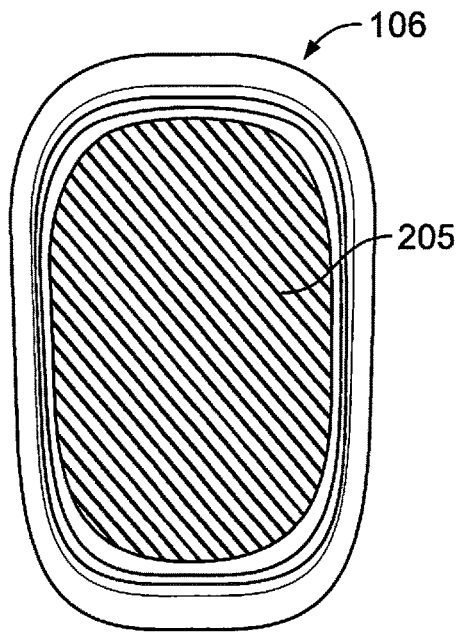
FIG. 2
FIG. 3
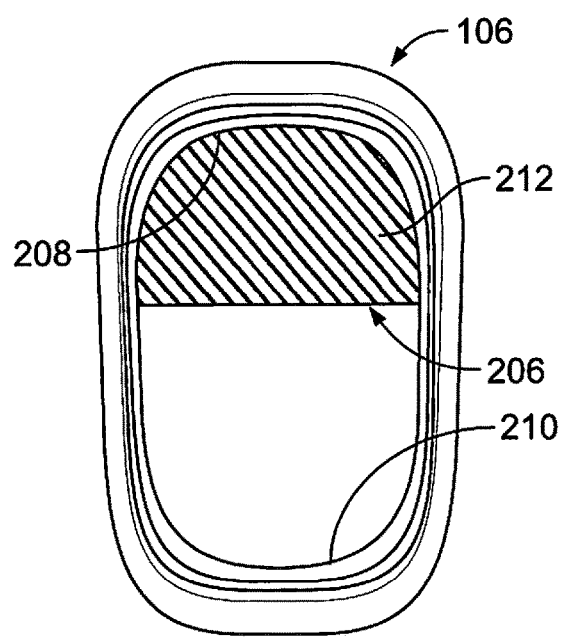
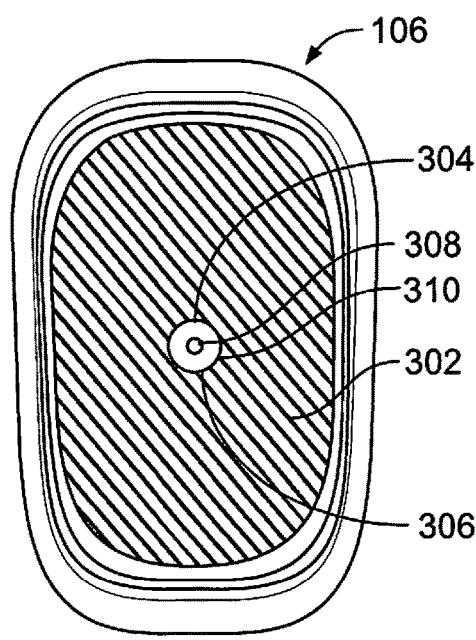
FIG. 4
FIG. 5

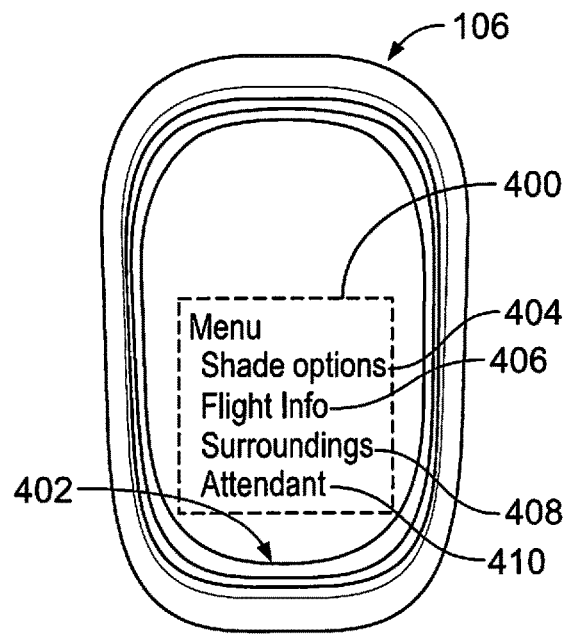
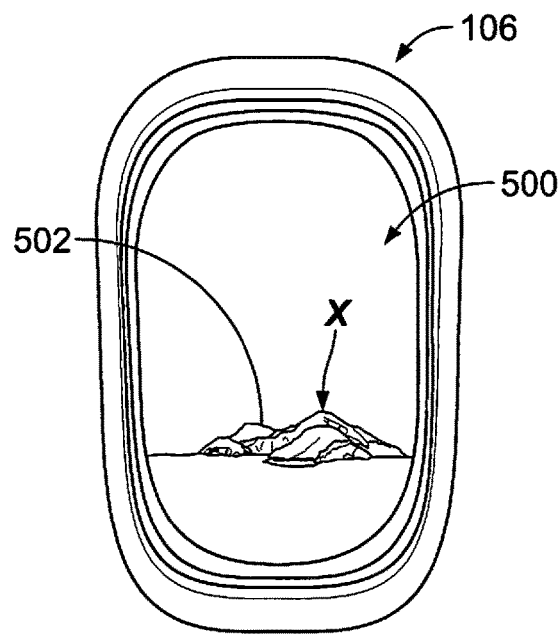
FIG. 6      FIG. 7
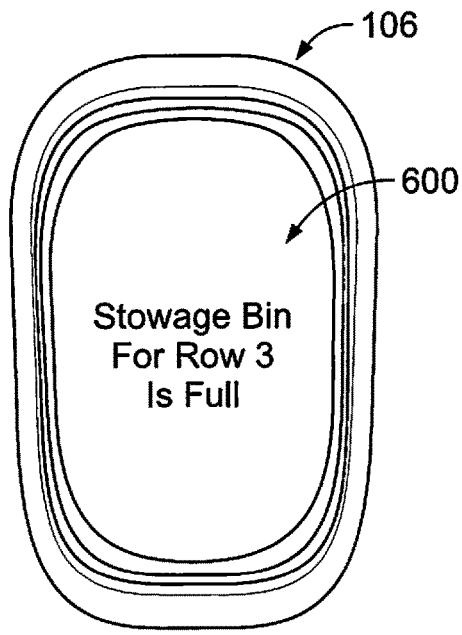
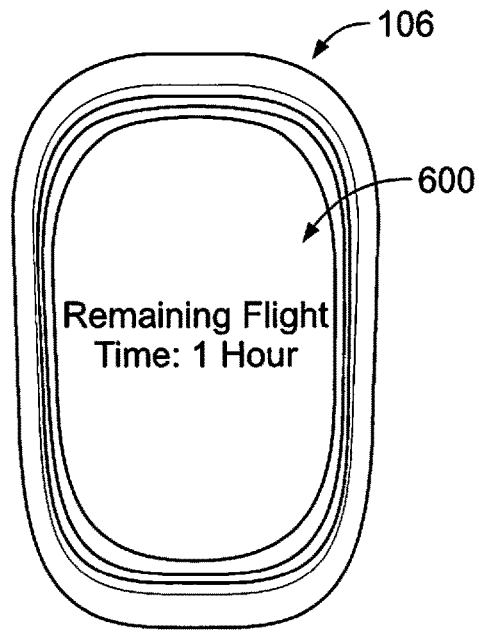
FIG. 8      FIG. 9

INTERACTIVE DIMMABLE WINDOW SYSTEMS AND METHODS

RELATED APPLICATIONS

This application relates to and claims priority benefits from U.S. Provisional Patent Application No. 62/572,847, entitled "Interactive Dimmable Window Systems and Methods," filed Oct. 16, 2017, which is hereby incorporated by reference in its entirety.

FIELD OF EMBODIMENTS OF THE DISCLOSURE

Embodiments of the present disclosure generally relate to interactive dimmable window systems and methods, such as within a commercial aircraft.

BACKGROUND OF THE DISCLOSURE

Commercial aircraft typically include an interior cabin that has windows that allow passengers to view outside of the aircraft. Passengers aboard various commercial aircraft are able to enjoy expansive views of an environment around the aircraft through the windows in the cabin. Nevertheless, certain passengers may wish to reduce the light entering the passenger cabin.

During takeoff, landing, or flight over landmarks, a passenger may wish to look through a window of the aircraft. Conversely, when a passenger wishes to rest or when a movie is playing, the passenger may desire to reduce the amount of light entering a window. As another example, the passenger may wish to reduce the amount of light entering a window to reduce heat inside the cabin.

The amount of light entering the cabin through a window is typically controlled through a light-blocking device such as a window shade. Many aircraft employ mechanical shades that may be lifted up or down to either allow light to enter the cabin or block light from entering the cabin through a window.

With increasing frequency, mechanical shades are being replaced with dimmable windows. A dimmable window may be controlled by a passenger to vary the amount of light entering the cabin.

A dimmable window panel typically changes light transmission properties of the dimmable window panel when voltage or heat is applied to the window. For example, a dimmable window panel may be transparent, opaque, or may one or more intermediate settings between being transparent and opaque. The dimmable window panel may also be referred to as smart glass.

Typically, a dimmable window may be selectively switched between a clear transparent setting, and a dimmed (for example, opaque) setting. Currently electrically shaded windows, such as those found on the Boeing 787 Dreamliner, shade an entirety of a window panel.

SUMMARY OF THE DISCLOSURE

A need exists for a dimmable window system that provides interactive features. Further, a need exists for a dimmable window system that allows an individual to interactively engage a dimmable window panel. Also, a need exists for dimmable window systems and methods that allow for only portions of the window to be dimmed, so as to allow a passenger to peek through the window without un-shading the entire window.

With those needs in mind, certain embodiments of the present disclosure provide an interactive dimmable window system that includes a dimmable window panel, and a passenger interface coupled to the dimmable window panel. The passenger interface includes a touchscreen that is configured to allow for touch-control of an electronic shade of the dimmable window panel. In at least one embodiment, a window control unit is operatively coupled to the dimmable window panel and the passenger interface. Certain embodiments of the present disclosure provide a vehicle that includes an internal cabin, and the interactive dimmable window system within the internal cabin.

The passenger interface is configured to allow the electronic shade to be selectively moved between a clear setting and a shaded setting. In at least one embodiment, the passenger interface is configured to allow a clear aperture to be formed through the electronic shade in the shaded setting by at least one physical gesture. The clear aperture may close after a predetermined period of time.

In at least one embodiment, a transparent display is coupled to the dimmable window panel. The display is configured to show information on the dimmable window panel. The display may be configured to show an interactive menu on the dimmable window panel. The menu may include options for shading, flight data, surroundings, and/or attendant call information. The display may be configured to show information relating to contents of a stowage bin on the dimmable window panel. The display may be configured to emit one or both of colored lighting effects or texture effects from the dimmable window panel.

Certain embodiments of the present disclosure provide an interactive dimmable window method that includes coupling a passenger interface to a dimmable window panel, and using a touchscreen of the passenger interface to control an electronic shade of the dimmable window panel. The using the touchscreen may include selectively moving the electronic shade between a clear setting and a shaded setting. Further, the using the touchscreen may include forming a clear aperture through the electronic shade in the shaded setting by at least one physical gesture.

BRIEF DESCRIPTION OF THE DRAWINGS

FIG. 2 illustrates a front view of a dimmable window panel in a clear state, according to an embodiment of the present disclosure.

FIG. 3 illustrates a front view of a dimmable window panel in a shaded state, according to an embodiment of the present disclosure.

FIG. 4 illustrates a front view of a dimmable window panel in a partially shaded state, according to an embodiment of the present disclosure.

FIG. 5 illustrates a front view of a dimmable window panel having a clear aperture formed through a shaded area, according to an embodiment of the present disclosure.

FIG. 6 illustrates a front view of a menu displayed on a dimmable window panel, according to an embodiment of the present disclosure.

FIG. 7 illustrates a front view of an outside environment location aid on a dimmable window panel, according to an embodiment of the present disclosure.

FIG. 8 illustrates a front view of a stowage bin status indicator on a dimmable window panel, according to an embodiment of the present disclosure.

FIG. 9 illustrates a front view of a flight status indicator on a dimmable window panel, according to an embodiment of the present disclosure.

DETAILED DESCRIPTION OF THE DISCLOSURE

Figure 1:
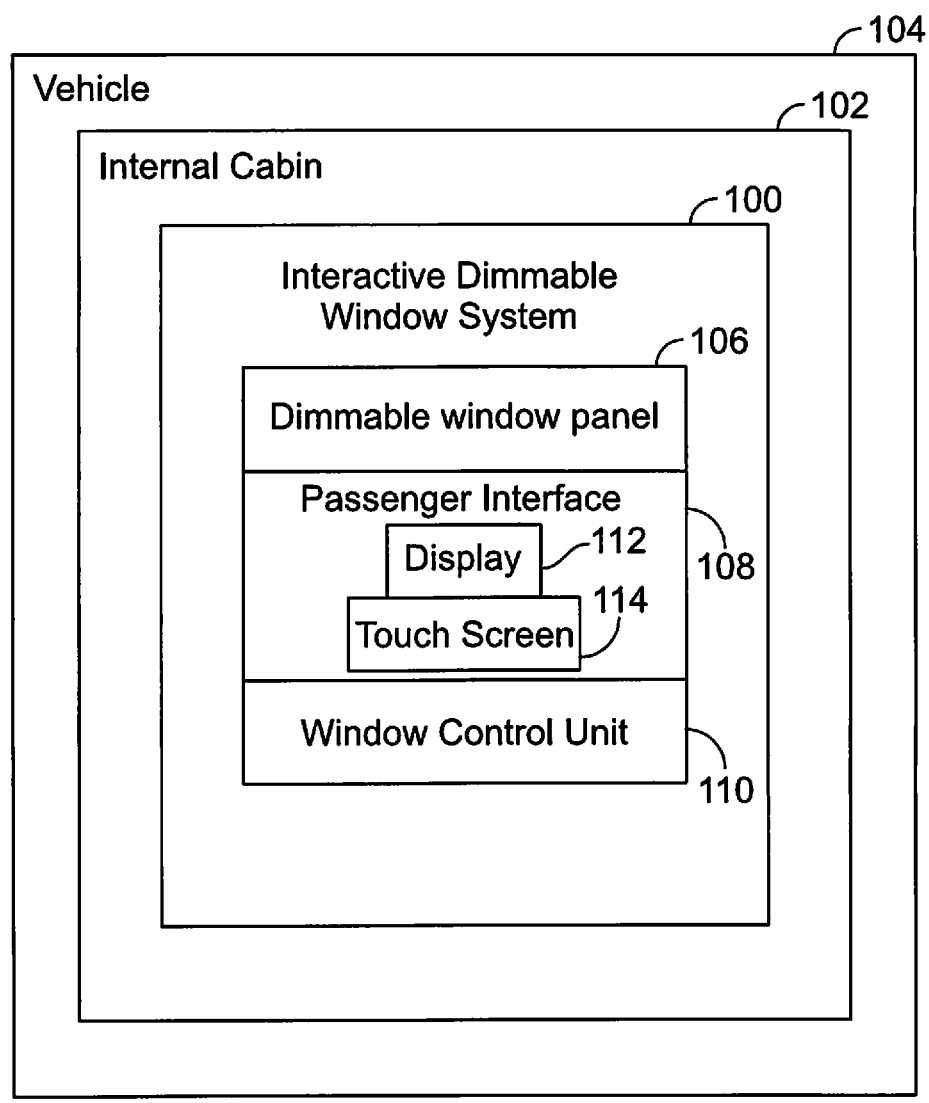
FIG. 1 illustrates a block diagram of an interactive dimmable window system within an internal cabin of a vehicle, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide interactive dimmable window systems and methods. Certain embodiments of the present disclosure provide transparent, interactive displays that enhance the passenger experience. For example, embodiments of the present disclosure allow passengers to interact with the window to control an electronic window shade that is user definable using finger gestures such as a swipe, a pinch, an expand, a zoom, and/or the like. The transparent display may be configured to provide information about the flight (such as wayfinding, connecting flights, trip data, and the like) and surroundings (geography, cities, constellations, and the like), and may be super-imposed on, embedded within, or formed as part of the window panel.

In at least one embodiment, the interactive dimmable window systems and methods allow passengers to create electronic clear apertures in shaded portions of the window, enabling a localized viewing experience of the outside world without flooding the cabin with light. The aperture may be time-controlled, and revert to a fully-shaded state after a set period of time.

Embodiments of the present disclosure provide systems and methods that reduce light flooding the cabin when a passenger seated next to a window chooses to look out of the window. Moreover, embodiments of the present disclosure provide systems and methods that enhance electronically dimmable windows beyond merely dimming capabilities.

The interactive dimmable window systems and methods provide for gesture-based user-definable apertures, and information (for example, text, graphics, and/or video) that may superimposed onto or within a window panel. A display of the system may be configured to show contents of a stowage bin. The display may also provide information regarding connecting flight information, trip data (for example, information regarding landmarks, geographic features, locations, and/or the like). In at least one embodiment, the systems and methods may be configured to control the ambiance of the cabin (such as by introduction of colored lighting effects into the cabin). Further, the systems and methods may also be configured to adjust the aesthetics of the cabin (such as by rendering different textures on the window). In at least one embodiment, the systems and methods may include a microphone input for communication with flight crew, and/or a video camera for visual communication with flight crew. Certain embodiments of the present disclosure allow the window to be used as a display, and/or a touch enabled user interface that allows passengers to use touch gestures to selectively control various aspects of the window.

In at least one embodiment, the interactive dimmable window systems and methods allow passengers to use finger gestures (for example, pinch and zoom, swiping, tapping, and/or the like) that selectively exposes (for example, unshades) at least a portion of an electronically shaded window in a passenger cabin.

FIG. 1 illustrates a block diagram of an interactive dimmable window system 100 within an internal cabin 102 of a vehicle 104, according to an embodiment of the present disclosure. In at least one embodiment, the vehicle 104 is a commercial jet. Optionally, the vehicle 104 may be other types of aircraft, a land-based vehicle (such as an automobile, bus, or the like), a watercraft (such as a boat), or a spacecraft.

The interactive dimmable window system 100 includes a dimmable window panel 106, a passenger interface 108, and a window control unit 110. The dimmable window panel 106 is an electrical window panel that is configured to be electrically varied between a clear setting, in which a passenger may look through the dimmable window panel 106, and a dimmed (for example, shaded) setting in which light from outside of the vehicle 104 is blocked (or substantially blocked) from passing into the internal cabin 102. For example, the Boeing 787 Dreamliner includes dimmable window panels. U.S. Pat. No. 9,146,438, entitled "Self-Powered Dimmable Windows With Integrated Controls," relates to electrically dimmable windows, and is hereby incorporated by reference in its entirety. U.S. Pat. No. 9,578,686, entitled "Aircraft Window Heating System," relates to dimmable window systems in aircraft, and is also hereby incorporated by reference in its entirety.

The passenger interface 108 is coupled to the dimmable window panel 106. For example, the passenger interface 108 may be overlaid onto the dimmable window panel 106. In at least one other embodiment, the passenger interface 108 may be embedded within the dimmable window panel 106. In at least one embodiment, the passenger interface 108 is integrally formed with the dimmable window panel 106. For example, the dimmable window panel 106 may include the passenger interface 108.

The passenger interface 108 is configured to interactively engage the dimmable window panel 106. For example, the passenger interface 108 is configured to adjust dimming (for example, shading) of the dimmable window panel 106, show graphics and/or text on the dimmable window panel, and/or the like.

The passenger interface 108 includes a display 112 and a touchscreen 114. In at least one embodiment, the display 112 is a transparent screen that is overlaid on and/or embedded into the dimmable window panel 106. The display 112 may be or include a plurality of light-emitting diodes (LEDs). In at least one embodiment, the display 112 includes a plurality of organic LEDs (OLEDs). For example, the display 112 may be an OLED display. In at least one other embodiment, the display 112 may be a liquid crystal display.

The touchscreen 114 may be layered onto the display 112, or may be embedded within the display 112. In at least one embodiment, the display 112 and the touchscreen provide a unitary system. The touchscreen 114 is configured to allow passengers to interact with the interactive dimmable window system 100 through engagement via finger gestures, for example.

The window control unit 110 is operatively coupled to the dimmable window panel 106 and the passenger interface 108, such as through one or more wired or wireless connections. The window control unit 110 is configured to control dimming of the dimmable window panel 106 and interactivity therewith via the passenger interface 108.

As described herein, the interactive dimmable window system 100 includes the dimmable window panel 106, and the passenger interface 108 coupled to the dimmable window panel 106. For example, the passenger interface 108 may be overlaid onto, embedded within, or formed with the dimmable window panel 106. The passenger interface 108 includes the touchscreen 114 that is configured to allow for touch-control of an electronic shade of the dimmable window panel 106.

In operation, a passenger is able to control the dimmable window panel 106 through the passenger interface 108. For example, the window control unit 110 includes or is otherwise coupled to a memory that stores instructions that correlate various gestures (such as finger engagements with the dimmable window panel 106) with operation of the dimmable window panel. For example, in order to increase dimming of the window panel 106, a passenger may engage the dimmable window panel 106 through the touchscreen 114 with a first gesture. The first gesture may be a tap. For example, a single tap of a finger on the dimmable window panel 106 may increase dimming of the window panel 106 a predetermined amount. In at least one embodiment, the single tap of the finger may fully shade the dimmable window panel 106. An additional single tap of the finger may un-shade the dimmable window panel 106. The single tap is merely an example of a gesture. Various other gestures may be used to shade and un-shade the dimmable window panel 106.

Certain areas of the dimmable window panel 106 may be designated for shading and un-shading based on a gesture, such as finger tap, swipe, or the like. For example, an upper half of the dimmable window panel 106 may be configured to increase shading based on a finger tap, swipe, or the like, while a lower half of the dimmable window panel 106 may be configured to decrease shading based on a finger tap, swipe, or the like.

In at least one embodiment, the gesture may be a finger drag from a top of the dimmable window panel 106 towards a bottom of the dimmable window panel 106 to shade the dimmable window panel 106. For example, as a passenger drags a finger from the top of the dimmable window panel 106 towards the bottom of the dimmable window panel 106, the dimmable window panel 106 becomes shaded to the extent that the finger continues to make contact with the dimmable window panel 106 and is moved towards the bottom of the dimmable window panel 106.

When the dimmable window panel 106 is dimmed (for example, shaded), a passenger may use another gesture to un-shade a portion of the dimmable window panel 106. For example, the passenger may use two fingers to pinch and expand a clear aperture (such as a clear hole) through the shaded dimmable window panel 106, in order to peer therethrough without flooding the internal cabin with light from outside the vehicle 104. In at least one other embodiment, the individual may gently poke an area of the shaded window panel 106 to provide a clear aperture through the shaded dimmable window panel 106. The clear aperture may be determined by the window control unit 110 to be a predetermined radius from the center of the finger poke, such as a 3 inch radius (optionally, the radius may be greater or less than 3 inches). The clear aperture formed through the shaded dimmable window panel 106 may remain open until the passenger touches the clear aperture again, which may then re-shade the area. In at least one embodiment, the window control unit 110 may automatically close the clear aperture after a predetermined period of time, such as 20 seconds (optionally, the window control unit 110 may close the clear opening after a greater or lesser period of time than 20 seconds).

In at least one embodiment, the window control unit 110 may show a menu on the display 112, based on a gesture from the passenger. For example, the passenger may tap a particular portion of the dimmable window panel 106, which may cause the window control unit 110 to show an interactive menu on the display 112, which shows on the dimmable window panel 106. The menu may include options for shading, flight data, surroundings, attendant call information, and/or the like. The menu may be shown over an entirety of the dimmable window panel 106, or a portion thereof. The menu may include graphics and/or text.

In at least one embodiment, the window control unit 110 may show various information about the flight (such as wayfinding, connecting flights, trip data, and/or the like) and surroundings (geography, cities, constellations, and the like) on the dimmable window panel 106. The window control unit 110 may show such information in response to a command from the passenger (such as through one or more interactive gestures with the passenger interface 108), and/or automatically without a command from the passenger (such as based on a current time, location of the vehicle 104, and/or the like).

In at least one embodiment, the window control unit 110 may show graphics and/or text on the dimmable window panel 106, via the display 112, that relate to contents of a stowage bin, such as those of the row in which the interactive dimmable window system 100 is located. For example, the window control unit 110 may indicate on the dimmable window panel 106 whether or not the stowage bin is full or not.

In at least one embodiment, the window control unit 110 may be configured to control the ambiance of the internal cabin 102, such as through colored lighting effects provided through the display 112. For example, the window control unit 110 may emit different colored light through the display 112, which is emitted into the internal cabin 102 from the dimmable window panel 106. Further, the window control unit 110 may also be configured to adjust the aesthetics of the cabin (such as by rendering different textures, for example, a brick or log cabin rendering) via the dimmable window panel 106.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the window control unit 110 may be or include one or more processors that are configured to control operation of the interactive dimmable window system 100, as described above.

The window control unit 110 is configured to execute a set of instructions that are stored in one or more data storage units or elements (such as one or more memories), in order to process data. For example, the window control unit 110 may include or be coupled to one or more memories. The data storage units may also store data or other information as desired or needed. The data storage units may be in the form of an information source or a physical memory element within a processing machine.

The set of instructions may include various commands that instruct the window control unit 110 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein illustrate one or more control or processing units, such as the window control unit 110. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the window control unit 110 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

FIG. 2 illustrates a front view of the dimmable window panel 106 in a clear state, according to an embodiment of the present disclosure. Referring to FIGS. 1 and 2, in the clear state, the dimmable window panel 106 is transparent and allows light from outside the vehicle 104 to pass into the internal cabin 102.

FIG. 3 illustrates a front view of the dimmable window panel 106 in a shaded (for example, fully-dimmed) state, according to an embodiment of the present disclosure. Referring to FIGS. 2 and 3, in the shaded state, the dimmable window panel 106 exhibits a shaded area 205 that is opaque and blocks (or substantially blocks) light from outside the vehicle 104 from passing into the internal cabin 102. The shaded area 205 represents an electronic shade of the dimmable window panel 106. The electronic shade 205 is moveable, by touch engagement by a passenger, between the shaded/dimmed state (representing a closed shade) shown in FIG. 3, and the clear state (representing an open shade) shown in FIG. 2.

Referring to FIGS. 1-3, in order to increase dimming of the dimmable window panel 106, a passenger may physically engage the dimmable window panel 106 through the touchscreen 114 with a first gesture, such as a finger tap, at a location 200 on the dimmable window panel 106. The finger tap at the location 200 (or any other location on the dimmable window panel 106) may increase shading of the dimmable window panel 106 a predetermined amount, or may fully shade the dimmable window panel 106 into the shaded state as shown in FIG. 3. An additional single tap of the finger on the shaded dimmable window panel 106 may un-shade the dimmable window panel 106.

Certain areas of the dimmable window panel 106 may be designated for shading and un-shading based on a gesture, such as finger tap, swipe, or the like. For example, an upper half 202 of the dimmable window panel 106 may be configured to increase shading based on a finger tap, swipe, or the like, while a lower half 204 of the dimmable window panel 106 may be configured to decrease shading based on a finger tap, swipe, or the like.

FIG. 4 illustrates a front view of the dimmable window panel 106 in a partially shaded state, according to an embodiment of the present disclosure. A passenger may utilize a finger drag 206 directed from a top 208 towards a bottom 210 of the dimmable window panel 106 to shade the dimmable window panel 106. For example, as a passenger drags the finger 206 from the top 208 of the dimmable window panel 106 towards the bottom 210 of the dimmable window panel 106, the dimmable window panel 106 becomes shaded to the extent that the finger 206 continues to make contact with the dimmable window panel 106 and moves towards the bottom 210 of the dimmable window panel 106. In order to un-shade the dimmable window panel 106, the passenger may press a finger onto a lower extent of the shaded area 212 and drag the finger 206 towards the top 208 of the dimmable window panel 106. Optionally, the dimmable window panel 106 may be selectively shaded and un-shaded through fingers drags from left-to-right, and/or vice versa.

FIG. 5 illustrates a front view of the dimmable window panel 106 having a clear aperture 300 formed through a shaded area 302, according to an embodiment of the present disclosure. Referring to FIGS. 1 and 5, when the dimmable window panel 106 is shaded, a passenger may use a finger gesture to un-shade a portion of the dimmable window panel 106 to form the clear aperture 300. For example, the passenger may use two finger presses 304 and 306 to pinch and expand the clear aperture 300, in order to peer therethrough without flooding the internal cabin 102 with light from outside the vehicle 104. In at least one other embodiment, the passenger may gently poke an area 308 of the shaded window panel 106 to provide the clear aperture 300 within the shaded area 302.

FIG. 6 illustrates a front view of a menu 400 displayed on the dimmable window panel 106, according to an embodiment of the present disclosure. The window control unit 110 may show the menu 400 on the display 112, based on a gesture from the passenger, and/or interaction with a physical control panel proximate to the dimmable window panel 106. For example, the passenger may tap a particular location 402 on the dimmable window panel 106, which may cause the window control unit 110 to show the interactive menu 400 on the dimmable window panel 106. The menu 400 may include link options for shading 404, flight data 406, surroundings 408, attendant call information 410, and/or the like. The menu 400 may be shown over an entirety of the dimmable window panel 106, or a portion thereof. The menu 400 may include graphics and/or text. The menu 400 may be displayed on the dimmable window panel 106 in the clear state (shown in FIG. 2) and/or the shaded state (shown in FIG. 3).

FIG. 7 illustrates a front view of an outside environment location aid 500 on the dimmable window panel 106, according to an embodiment of the present disclosure. Referring to FIGS. 1 and 7, the window control unit 110 may superimpose the location aid 500 in relation to a view of an outside environmental feature 502, such as a landmark, city, landscape feature, and/or the like. In at least one embodiment, the window control unit 110 may show various information about the flight (such as wayfinding, connecting flights, trip data, and/or the like) and surroundings (geography, cities, constellations, and the like) on the dimmable window panel 106. The window control unit 110 may show such information in response to a command from the passenger (such as through one or more interactive gestures with the passenger interface 108), and/or automatically without a command from the passenger (such as based on a current time, location of the vehicle 104, and/or the like). The information (such as the location aid 500) may be displayed on the dimmable window panel 106 in the clear state (shown in FIG. 2) and/or the shaded state (shown in FIG. 3).

FIG. 8 illustrates a front view of a stowage bin status indicator 600 on the dimmable window panel 106, according to an embodiment of the present disclosure. The window control unit 110 may show the stowage bin status indicator 600, which may include graphics and/or text, on the dimmable window panel 106. The stowage bin status indicator 600 may be displayed on the dimmable window panel 106 in the clear state (shown in FIG. 2) and/or the shaded state (shown in FIG. 3).

FIG. 9 illustrates a front view of a flight status indicator 600 on a dimmable window panel 106, according to an embodiment of the present disclosure. Referring to FIGS. 1 and 9, the window control unit 110 may show the flight status indicator 600, which may provide information regarding the current flight, on the dimmable window panel 106. The flight status indicator 600 may be displayed on the dimmable window panel 106 in the clear state (shown in FIG. 2) and/or the shaded state (shown in FIG. 3).

Referring to FIGS. 1-9, the interactive dimmable window system 100 allows a passenger to interact with the dimmable window panel 106 to control shading thereof. Through one or more finger gestures, the passenger may form a clear aperture within a shaded portion of the dimmable window panel 106. Further, the interactive dimmable window system 100 may also be configured to show various information on the dimmable window panel 106, such as in response to commands input by the passenger via one or more finger gestures on the dimmable window panel 106.

Figure 10:
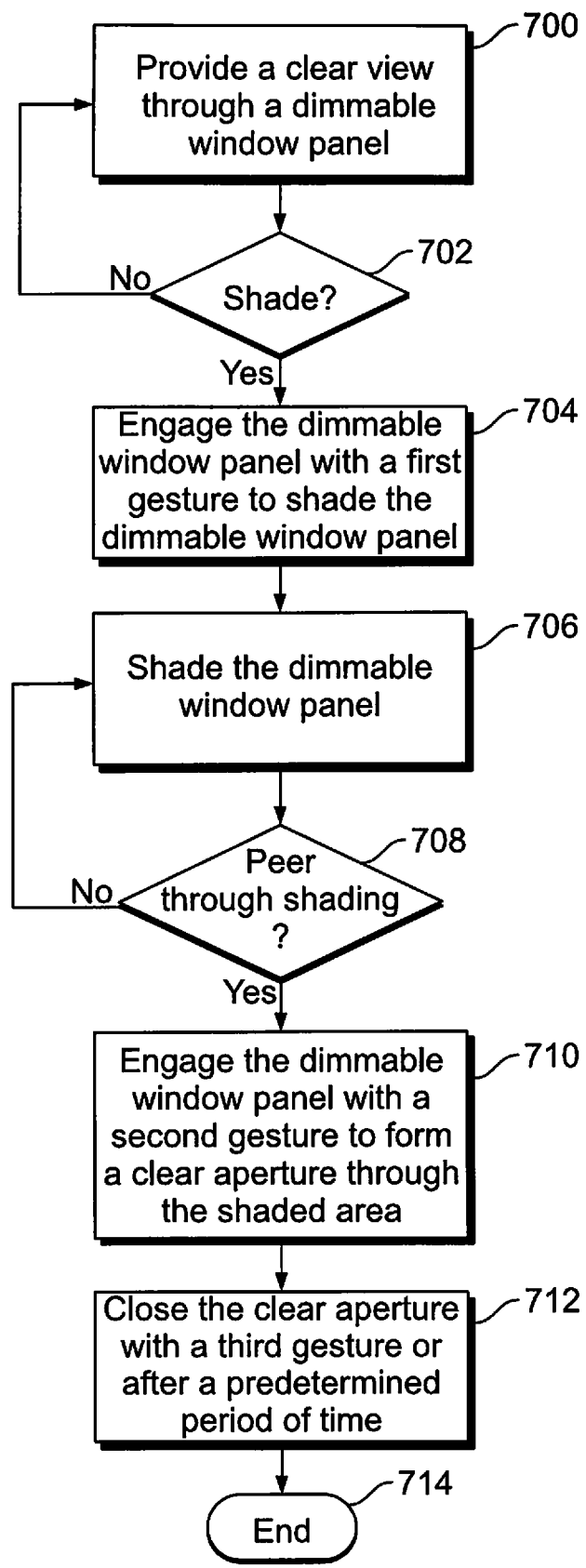
FIG. 10 illustrates a flow chart of a method of operating an interactive dimmable window system, according to an embodiment of the present disclosure.

FIG. 10 illustrates a flow chart of a method of operating an interactive dimmable window system, according to an embodiment of the present disclosure. Referring to FIGS. 1 and 10, the method begins at 700, at which the window control unit 110 provides a clear view through the dimmable window panel 106. That is, the dimmable window panel 106 is in the clear state.

At 702, a passenger decides if shading is desired. If not, the method returns to 700.

If, however, shading is desired, the method proceeds from 702 to 704, at which the passenger physically engages the dimmable window panel 106 with a first finger gesture (such as a poke, swipe, pinch, expansion, zoom, and/or the like on an exposed surface of the dimmable window panel 106) to shade the dimmable window panel 106. At 706, in response to the first gesture, the window control unit 110 shades the dimmable window panel 106.

At 708, the passenger decides whether or not to peer through the shaded dimmable window panel 106. If not, the method returns to 706.

If, however, the passenger desires to peer through the shaded dimmable window panel, the method proceeds from 708 to 710, at which the passenger physically engages the dimmable window panel 106 with a second gesture (such as a finger pinch and expansion on an exposed surface of the dimmable window panel 106) to form a clear aperture through the shaded area.

At 712, the window control unit 110 closes the clear aperture in response to a third gesture from the passenger in relation to the dimmable window panel 106 and/or after a predetermined period of time. The method then ends at 714.

Figure 11:
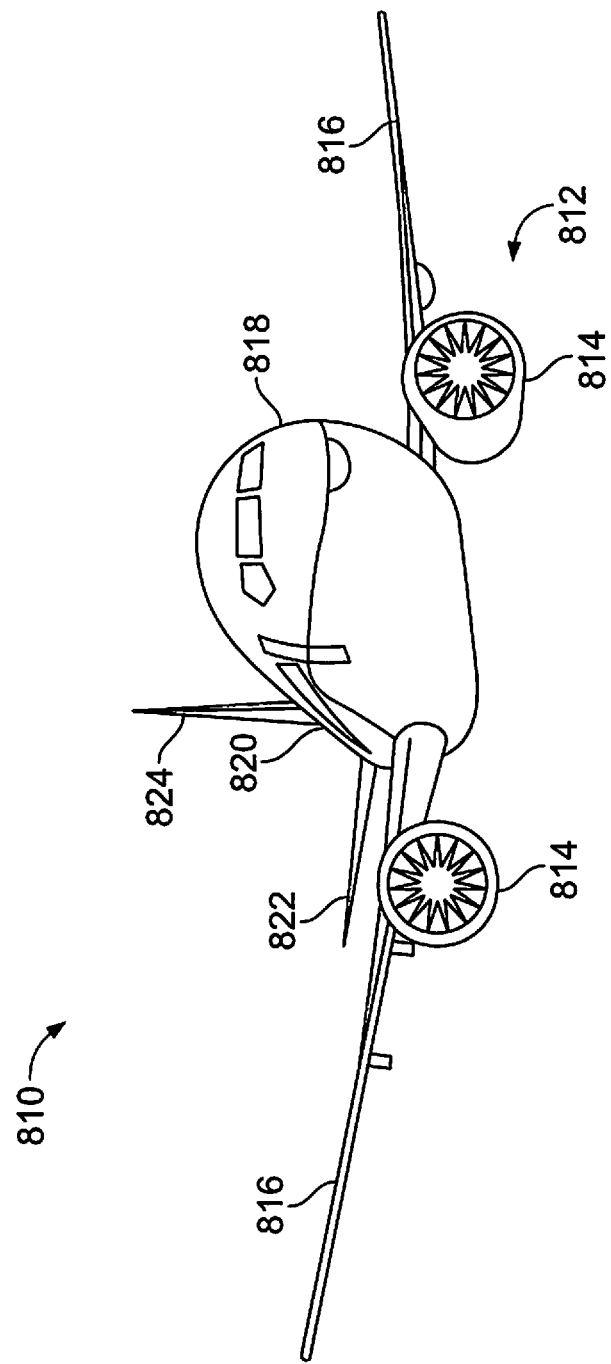
FIG. 11 illustrates a perspective front view of an aircraft, according to an embodiment of the present disclosure.

FIG. 11 illustrates a perspective front view of an aircraft 810, according to an embodiment of the present disclosure. The aircraft 810 is an example of the vehicle 104 shown in FIG. 1. The aircraft 810 includes a propulsion system 812 that may include two turbofan engines 814, for example. Optionally, the propulsion system 812 may include more engines 814 than shown. The engines 814 are carried by wings 816 of the aircraft 810. In other embodiments, the engines 814 may be carried by a fuselage 818 and/or an empennage 820. The empennage 820 may also support horizontal stabilizers 822 and a vertical stabilizer 824.

The fuselage 818 of the aircraft 810 defines an internal cabin (such as the internal cabin 102 shown in FIG. 1), which includes a cockpit, one or more work sections (for example, galleys, personnel carry-on baggage areas, and the like), one or more passenger sections (for example, first class, business class, and coach sections), and an aft section. Each of the sections may be separated by a cabin transition area, which may include one or more class/section divider assemblies, as described herein. The aircraft 810 may include one or more interactive dimmable window systems 100, such as shown and described with respect to FIGS. 1-10.

Alternatively, instead of an aircraft, embodiments of the present disclosure may be used with various other vehicles, such as automobiles, buses, locomotives and train cars, seacraft, spacecraft, and the like.

Figure 12A:
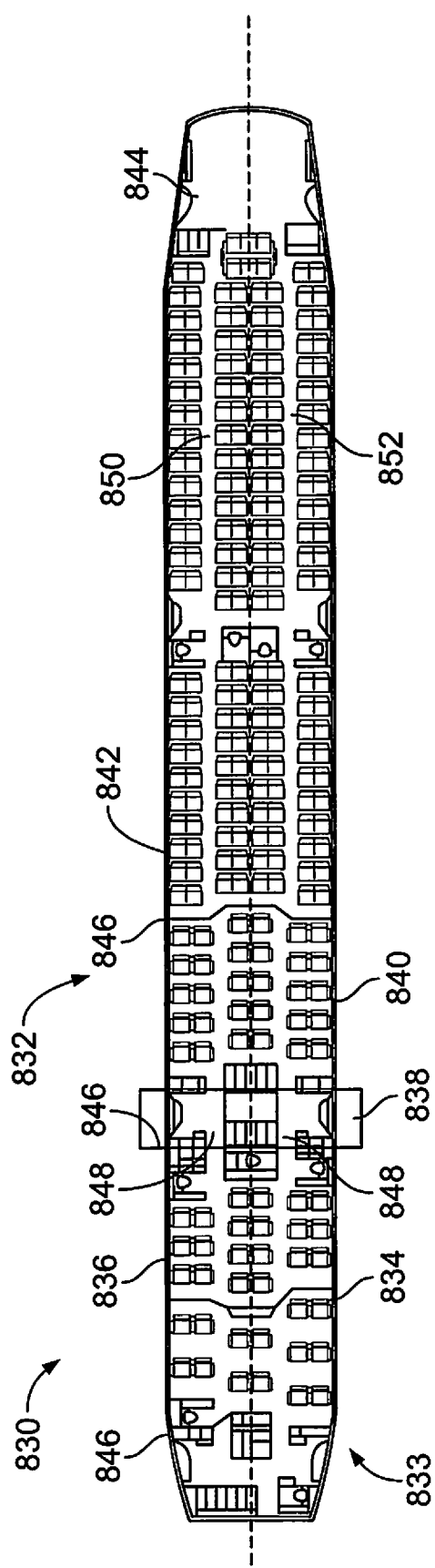
FIG. 12A illustrates a top plan view of an internal cabin of an aircraft, according to an embodiment of the present disclosure.

FIG. 12A illustrates a top plan view of an internal cabin 830 of an aircraft, according to an embodiment of the present disclosure. The internal cabin 830 may be within a fuselage 832 of the aircraft 810, shown in FIG. 11. For example, one or more fuselage walls may define the internal cabin 830. The internal cabin 830 includes multiple sections, including a front section 833, a first class section 834, a business class section 836, a front galley station 838, an expanded economy or coach section 840, a standard economy or coach section 842, and an aft section 844, which may include multiple lavatories and galley stations. It is to be understood that the internal cabin 830 may include more or less sections than shown. For example, the internal cabin 830 may not include a first class section, and may include more or less galley stations than shown. Each of the sections may be separated by a cabin transition area 846, which may include class/section divider assemblies between aisles 848.

As shown in FIG. 12A, the internal cabin 830 includes two aisles 850 and 852 that lead to the aft section 844. Optionally, the internal cabin 830 may have less or more aisles than shown. For example, the internal cabin 830 may include a single aisle that extends through the center of the internal cabin 830 that leads to the aft section 844. The internal cabin 830 may include one or more interactive dimmable window systems 100, such as shown and described with respect to FIGS. 1-10.

Figure 12B:
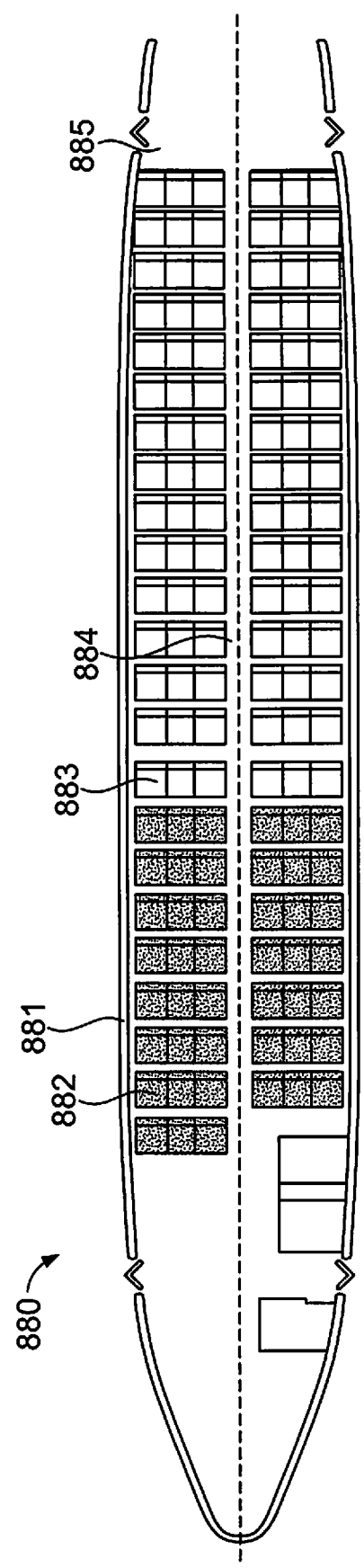
FIG. 12B illustrates a top plan view of an internal cabin of an aircraft, according to an embodiment of the present disclosure.

FIG. 12B illustrates a top plan view of an internal cabin 880 of an aircraft, according to an embodiment of the present disclosure. The internal cabin 880 may be within a fuselage 881 of the aircraft 810, shown in FIG. 11. For example, one or more fuselage walls may define the internal cabin 880. The internal cabin 880 includes multiple sections, including a main cabin 882 having passenger seats 883, and an aft section 885 behind the main cabin 882. It is to be understood that the internal cabin 880 may include more or less sections than shown.

The internal cabin 880 may include a single aisle 884 that leads to the aft section 885. The single aisle 884 may extend through the center of the internal cabin 880 that leads to the aft section 885. For example, the single aisle 884 may be coaxially aligned with a central longitudinal plane of the internal cabin 880. The internal cabin 880 may include one or more interactive dimmable window systems 100, such as shown and described with respect to FIGS. 1-10.

Referring to FIGS. 1-12B, embodiments of the present disclosure provide dimmable window systems and methods (such as may be used with a commercial aircraft) that provide interactive features. The dimmable window systems and methods allow an individual to interactively engage a dimmable window panel. Also, the dimmable window systems and methods allow for only portions of the window to be dimmed, so as to allow a passenger to peek through the window without un-shading the entire window, which may otherwise expose more light into the cabin than desired.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An interactive dimmable window system within an aircraft, the interactive dimmable window system comprising:
   a dimmable window panel;
   a passenger interface coupled to the dimmable window panel, wherein the passenger interface includes a touchscreen that is configured to allow for touch-control of an electronic shade of the dimmable window panel; and
   a window control unit operatively coupled to the dimmable window panel and the passenger interface, wherein the window control unit controls the dimmable window panel and interactivity with the dimmable window panel via the passenger interface, wherein the window control unit shows an interactive menu on the dimmable window panel, wherein the interactive menu comprises options for shading, flight data, surroundings, and attendant call information.

2. The interactive dimmable window system of claim 1, wherein the passenger interface is configured to allow the electronic shade to be selectively moved between a clear setting and a shaded setting.

3. The interactive dimmable window system of claim 2, wherein the passenger interface allows a clear aperture to be formed through the electronic shade in the shaded setting by at least one physical gesture.

4. The interactive dimmable window system of claim 3, wherein the clear aperture closes after a predetermined period of time.

5. The interactive dimmable window system of claim 1, further comprising a transparent display coupled to the dimmable window panel, wherein the display is configured to show information including the interactive menu on the dimmable window panel.

6. The interactive dimmable window system of claim 1, wherein the window control unit also shows information relating to contents of a stowage bin on the dimmable window panel.

7. The interactive dimmable window system of claim 1, wherein the window control unit further emits one or both of colored lighting effects or texture effects from the dimmable window panel.

8. An interactive dimmable window method within an aircraft, comprising:
coupling a passenger interface to a dimmable window panel;
using a touchscreen of the passenger interface to control an electronic shade of the dimmable window panel;
operatively coupling a window control unit to the dimmable window panel and the passenger interface; and
controlling, by the window control unit, the dimmable window panel and interactivity with the dimmable window panel via the passenger interface, wherein the controlling comprises showing an interactive menu on the dimmable window panel, wherein the interactive menu comprises options for shading, flight data, surroundings, and attendant call information.

9. The interactive dimmable window method of claim 8, wherein the using the touchscreen comprises selectively moving the electronic shade between a clear setting and a shaded setting.

10. The interactive dimmable window method of claim 9, wherein the using the touchscreen comprises forming a clear aperture through the electronic shade in the shaded setting by at least one physical gesture.

11. The interactive dimmable window method of claim 10, further comprising closing, without user intervention, the clear aperture after a predetermined period of time.

12. The interactive dimmable window method of claim 8, further comprising:
coupling a transparent display to the dimmable window panel; and
using the display to show information including the interactive menu on the dimmable window panel.

13. The interactive dimmable window method of claim 8, wherein the controlling further comprises showing information relating to contents of a stowage bin on the dimmable window panel.

14. The interactive dimmable window method of claim 8, wherein the controlling further comprises emitting one or both of colored lighting effects or texture effects from the dimmable window panel.

15. A vehicle comprising:
an internal cabin; and
an interactive dimmable window system within the internal cabin, wherein the interactive dimmable window system, includes:
a dimmable window panel;
a passenger interface coupled to the dimmable window panel, wherein the passenger interface includes a touchscreen that is configured to allow for touch-control of an electronic shade of the dimmable window panel; and
a window control unit operatively coupled to the dimmable window panel and the passenger interface, wherein the window control unit controls the dimmable window panel and interactivity with the dimmable window panel via the passenger interface, wherein the window control unit shows an interactive menu on the dimmable window panel, wherein the interactive menu comprises options for shading, flight data, surroundings, and attendant call information.

16. The vehicle of claim 15, wherein the passenger interface is configured to allow the electronic shade to be selectively moved between a clear setting and a shaded setting.

17. The vehicle of claim 16, wherein the passenger interface is configured to allow a clear aperture to be formed through the electronic shade in the shaded setting by at least one physical gesture.

18. The vehicle of claim 17, wherein the clear aperture automatically closes, without user intervention, after a predetermined period of time.

19. The vehicle of claim 15, wherein the interactive dimmable window system further comprises a transparent display coupled to the dimmable window panel, wherein the display is configured to show information including the interactive menu on the dimmable window panel.

20. The vehicle of claim 19, wherein the window control unit further shows information relating to contents of a stowage bin on the dimmable window panel.

21. The vehicle of claim 19, wherein the window control unit further emits one or both of colored lighting effects or texture effects from the dimmable window panel.

\* \* \* \* \*